(12) United States Patent
Morel et al.

(10) Patent No.: US 11,201,448 B1
(45) Date of Patent: Dec. 14, 2021

(54) OPTICAL MIXING APPROACH FOR CONTROLLING ELECTRO-MAGNETIC ATTRIBUTES OF EMITTED LASER PULSES

(71) Applicant: BAE SYSTEMS Information and Electronic Systems Integration Inc., Nashua, NH (US)

(72) Inventors: Yannick Morel, Falls Church, VA (US); Peter Budni, Nashua, NH (US); Peter Ketteridge, Amherst, NH (US); Michael Lemons, Antrim, NH (US); Kevin T Werner, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/109,471

(22) Filed: Dec. 2, 2020

(51) Int. Cl.
*H01S 3/00* (2006.01)
*G02F 1/39* (2006.01)
*G02F 1/355* (2006.01)
*G02F 1/35* (2006.01)
*H01S 3/16* (2006.01)

(52) U.S. Cl.
CPC ............ *H01S 3/0057* (2013.01); *G02F 1/354* (2021.01); *G02F 1/3528* (2021.01); *G02F 1/3551* (2013.01); *G02F 1/392* (2021.01); *G02F 2203/11* (2013.01); *H01S 3/1625* (2013.01); *H01S 3/1636* (2013.01)

(58) Field of Classification Search
CPC ...... G02F 1/3528; G02F 1/354; G02F 1/3551; G02F 1/392; G02F 2203/11; H01S 3/0057; H01S 3/1625; H01S 3/1636
See application file for complete search history.

(56) References Cited

U.S. PATENT DOCUMENTS

| | | | |
|---|---|---|---|
| 7,733,926 B2 | 6/2010 | Pomeranz | |
| 8,073,026 B2* | 12/2011 | Chang | H01S 3/0057 372/29.011 |
| 8,379,296 B2 | 2/2013 | Schunemann et al. | |
| 8,599,889 B2* | 12/2013 | Biegert | H01S 3/10 372/25 |
| 8,995,494 B1 | 3/2015 | Pomeranz et al. | |

(Continued)

OTHER PUBLICATIONS

S. L. Chin et al., Advances in Intense Femtosecond Laser Filamentation in Air, Laser Physics vol. 22 No. 1 2012.

(Continued)

*Primary Examiner* — Daniel Petkovsek
(74) *Attorney, Agent, or Firm* — KPIP Law, PLLC; Scott J. Asmus

(57) ABSTRACT

The system and method of producing a first path comprising a pulse stretcher for a mid-wave infrared (MWIR) signal, an optical parametric chirped-pulse amplification (OPCPA) amplifier, and a MWIR compressor for producing a first beam in a MWIR portion of the spectrum and a second path comprising a pulse stretcher for a long wave infrared (LWIR) signal, an OPCPA amplifier, and a LWIR compressor for producing a second beam in a LWIR portion of the spectrum. Each beam, on its own, is configured to produce laser-matter interactions at long range (100s of meters), having nonlinear effects and favoring supercontinuum generation spanning multiple octaves, that is temporally and spatially overlapped with the fundamental laser beam.

19 Claims, 4 Drawing Sheets

(56) References Cited

U.S. PATENT DOCUMENTS

| | | | |
|---|---|---|---|
| 9,069,229 B2 | 6/2015 | Schunemann et al. | |
| 9,225,137 B2* | 12/2015 | Chang | H01S 3/1307 |
| 9,407,059 B2 | 8/2016 | Pomeranz et al. | |
| 10,104,756 B1 | 10/2018 | Chang et al. | |
| 10,274,809 B1 | 4/2019 | Pomeranz et al. | |
| 10,790,631 B2* | 9/2020 | Chang | H01S 3/0057 |
| 2010/0074281 A1 | 3/2010 | Pomeranz | |
| 2011/0054451 A1 | 3/2011 | Schunemann et al. | |
| 2013/0158528 A1 | 6/2013 | Schunemann et al. | |
| 2015/0171590 A1 | 6/2015 | Pomeranz et al. | |
| 2018/0138652 A1 | 5/2018 | Kelly et al. | |
| 2020/0244047 A1* | 7/2020 | Ota | H01S 5/509 |

OTHER PUBLICATIONS

D. J. Cook, et al., Intense terahertz pulses by four-wave rectification in air, Optics Letters, vol. 25, No. 16, Aug. 15, 2000.

V. Y. Federov et al., Extreme THz fields from two-color filamentation of midinfrared laser pulses, Physical Review A 97, 063842 (2018).

P. Xia et al., Generation of sub-two-cycle CEP-stable optical pulses at 3.5 µm by multiple-plate pulse compression for high-harmonic generation in crystals, EPJ Web of Conferences 205, 01006 (2019) https://doi.org/10.1051/epjconf/20192050100.

J. Zhang et al., Kerr-Lens Mode-Locked 2-µm Thin-Disk Lasers, IEEE Journal of Selected Topics in Quantum Electronics, vol. 24, No. 5, Sep./Oct. 2018.

S. Cheng et al., Compact Ho:YLF-pumped ZnGeP2-based optical parametric amplifiers tunable in the molecular fingerprint regime, Optics Letters, vol. 45, No. 8, Apr. 15, 2020.

J. Zhang et al, Multi-mW, few-cycle mid-infrared continuum spanning from 500 to 2250cm—1,Light: Science & Applications (2018) 7, 17180.

G. Andriukaitis et al., 90 GW peak power few-cycle mid-infrared pulses from an optical parametric amplifier, Optics Letters, vol. 36, No. 15, Aug. 1, 2011.

Dey et al., Highly efficient broadband terahertz generation from ultrashort laser filamentation in liquids, Nature Communications, vol. 8, No. 1184, Oct. 30, 2017.

* cited by examiner

OPTICAL MIXING APPROACH FOR CONTROLLING ELECTRO-MAGNETIC ATTRIBUTES OF EMITTED LASER PULSES

FIELD OF THE DISCLOSURE

The present disclosure relates to plasma emission induced by ultra-short pulse lasers and more particularly to an optical mixing approach for controlling the electro-magnetic attributes of the emission from a single source and over long ranges.

BACKGROUND OF THE DISCLOSURE

Filamentation by ultra-short pulse lasers (USPL) has been shown to produce extremely broadband secondary electromagnetic emission encompassing both RF and optical domains. In particular, it has been recognized as a source of intense THz wave generation. Conventional systems have used a 2-color approach to enhance the THz emission by several orders of magnitude. These conventional methods are usually based on mixing a fundamental laser wavelength with its second harmonic at short range (less than one meter) using a beta barium borate (BBO) crystal, or the like, in line with a fundamental beam. This approach is difficult to implement at longer range for a number of reasons. For example, one needs to spatially and temporally overlap the two ultra-short pulse laser beams with great precision. This is increasingly harder to achieve as the range is extended because propagation through the atmosphere introduces temporal and phase distortions that need to be compensated for. Since the two beams have different propagation speeds, one of them needs to be delayed so that they temporally overlap at the desired range. In addition, different group velocity dispersion between the two beams give rise to different temporal elongation (pulse width), which might result in the two beams focusing at different ranges and thus losing their spatial overlap. To maintain, both temporal and spatial overlap at long range, one needs to implement complex scheme that results in cumbersome and delicate laser system. For example, to temporally overlap two beams with 100 fs pulse width at 1 km, one needs to maintain a path difference between the two beams better than 30 µm over the entire 1 km range.

Using more beams, mixing fundamental, $2^{nd}$ and $3^{rd}$ harmonics has been shown to provide even more enhancement to the THz generation than just two colors but the system becomes so complicated to retain temporal and spatial overlap of all beams that is it almost impossible to use at long range (>100 m).

Prior systems are at short range (<1 m) and use a Ti: Sapphire laser, or the like, operating at 800 nm. In two-arm second harmonic generation (SHG) methods, medium range (up to 10s of meters) is possible as these systems provide independent control over the two beams, but these systems are not ideal for long range as outlined above. These systems require separate control of both beams with temporal delay with very fine control (e.g., 100 fs or 30 µm precision) and beam pointing accuracy commensurate with range.

Wherefore it is an object of the present disclosure to overcome the above-mentioned shortcomings and drawbacks associated with the control of conventional short laser pulses.

SUMMARY OF THE DISCLOSURE

One aspect of the present disclosure is a method of controlling electro-magnetic attributes of emitted laser pulses, comprising: providing a common source for producing multiple frequency bands without experiencing temporal distortions, the common source comprising: an ultra-short pulse laser oscillator; a pulse stretcher; and an amplifier, wherein the stretcher allows for amplification to be done on longer pulses and avoid damaging effects; feeding an output from the amplifier into a compressor; compressing the output form the amplifier to produce a strong pulse in ultra-short pulse lengths, wherein stretching and compressing the signals achieves chirp-pulse amplification; and feeding the compressed signal through a non-linear optical material to create a wider band signal; wherein a path comprises a pulse stretcher for a mid-wave infrared signal, an optical parametric chirped-pulse amplification amplifier, and a MWIR compressor for producing a beam in a MWIR portion of the spectrum; and wherein propagation through air at MWIR wavelengths self generates harmonics on either side of the carrier spectrum via high harmonic generation and supercontinuum generation.

One embodiment of the method is wherein mid wave infrared (MWIR) portion of the spectrum is about 2-8 µm. Another embodiment of the method is wherein the ultra-short pulse laser oscillator operates at about 2 µm wavelength. In certain cases, long range is 100s of meters.

Yet another embodiment of the method is wherein the non-linear material is a Zinc Germanium diPhosphide (ZGP) crystal.

In certain embodiments, spectral components of the supercontinuum mix with each other as well as the fundamental beam and enhance secondary emission in the RF and THz domain.

Another aspect of the present disclosure is a method of controlling electro-magnetic attributes of emitted laser pulses, comprising: providing a common source for producing multiple frequency bands without experiencing temporal distortions, the common source comprising: an ultra-short pulse laser oscillator; a pulse stretcher; and an amplifier, wherein the stretcher allows for amplification to be done on longer pulses and avoid damaging effects; feeding an output from the amplifier into a compressor; compressing the output form the amplifier to produce a strong pulse in ultra-short pulse lengths, wherein stretching and compressing the signals achieves chirp-pulse amplification; and feeding the compressed signal through a non-linear optical material to create a wider band signal; wherein a path comprises a pulse stretcher for a long wave infrared (LWIR) signal, an OPCPA amplifier, and a LWIR compressor for producing a second beam in a LWIR portion of the spectrum; and wherein propagation through air at LWIR wavelengths self generates harmonics on either side of the carrier spectrum via high harmonic generation (HHG) and supercontinuum generation.

One embodiment of the method is wherein long wave infrared (LWIR) portion of the spectrum is about 8-12 µm. Another embodiment of the method is wherein the ultra-short pulse laser oscillator operates at about 2 µm wavelength.

In certain embodiments, long range is 100s of meters.

Yet another embodiment of the method is wherein the non-linear material is a Zinc Germanium diPhosphide (ZGP) crystal. In certain embodiments, spectral components of the supercontinuum mix with each other as well as the fundamental beam and enhance secondary emission in the RF and THz domain.

Yet another aspect of the present disclosure is a method of controlling electro-magnetic attributes of emitted laser pulses, comprising: providing a common source operating in the mid wave infrared range for simultaneously producing multiple frequency bands without experiencing temporal distortions, the common source comprising: an ultra-short pulse laser oscillator; a pulse stretcher; and an amplifier, wherein the stretcher allows for amplification to be done on longer pulses and avoid damaging effects; feeding an output from the amplifier into a compressor; compressing the output from the amplifier to produce a strong pulse in ultra-short pulse lengths, wherein stretching and compressing the signals achieves chirp-pulse amplification; feeding the compressed signal through a non-linear optical material to create a wider band signal; and splitting the wider band signal into a first path and a second path; wherein the first path comprises a pulse stretcher for a mid-wave infrared (MWIR) signal, an optical parametric chirped-pulse amplification (OPCPA) amplifier, and a MWIR compressor for producing a first beam in a MWIR portion of the spectrum; wherein the second path comprises a pulse stretcher for a long wave infrared (LWIR) signal, an OPCPA amplifier, and a LWIR compressor for producing a second beam in a LWIR portion of the spectrum; wherein propagation through air at MWIR or LWIR wavelengths self generates harmonics on either side of the carrier spectrum via high harmonic generation (HHG) and supercontinuum generation; and wherein spectral components of either supercontinuum mix with each other as well as the fundamental beam and enhance secondary emission in the RF and THz domain.

One embodiment of the method is wherein the ultra-short pulse laser oscillator operates at about 2 μm wavelength.

Another embodiment of the method is wherein the long range is 100s of meters.

Yet another embodiment of the method is wherein the non-linear material is a Zinc Germanium diPhosphide (ZGP) crystal.

Still yet another embodiment of the method is wherein the mid wave infrared (MWIR) portion of the spectrum is about 2-8 μm and the long wave infrared (LWIR) portion of the spectrum is about 8-12 μm.

In certain embodiments, the method further comprises varying laser polarization, chirp, and beam size for controlling the range at which laser-matter interactions occur.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
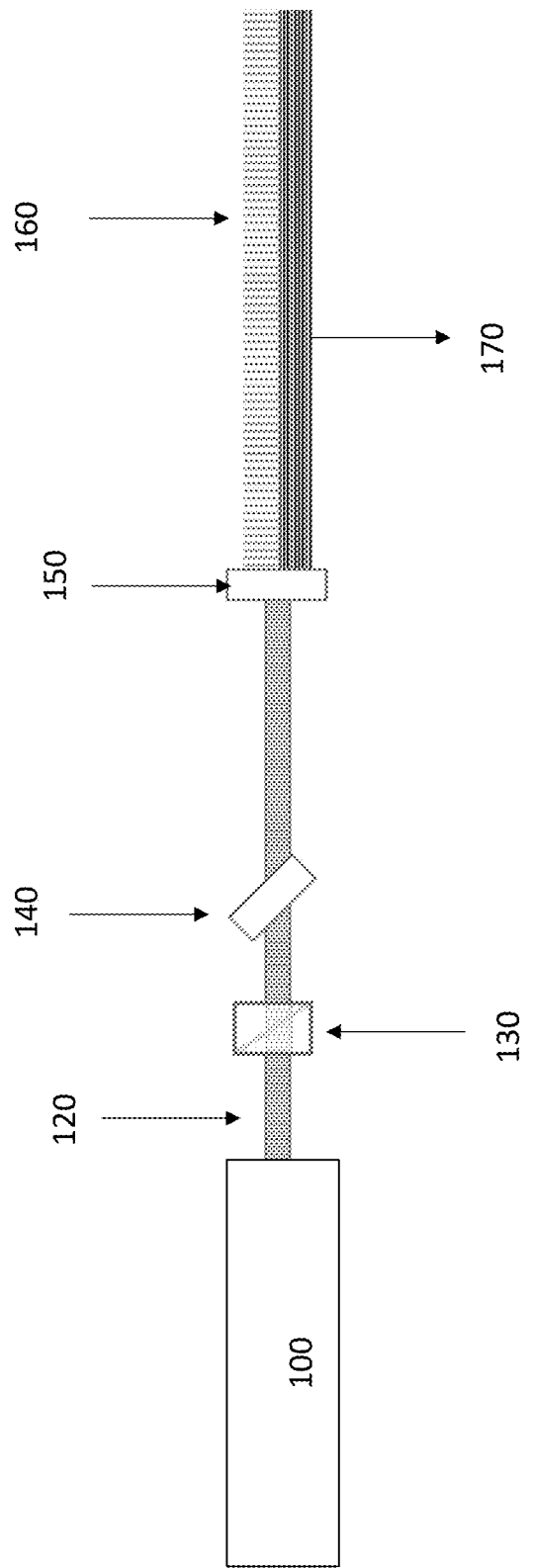
FIG. 1 is a diagram of a conventional laser system configured for second harmonic generation (SHG) usable at short range (less than one meter).

One embodiment of the present disclosure is an optical mixing approach for control of electro-magnetic attributes of ultra-short pulse laser (USPL) induced plasma emission. In one embodiment, the manifested effects or phenomena occur with a single launch wavelength which simplifies system controls and permits a wide range of control and flexibility. In certain embodiments, longer ranges and different frequency focused standoff electromagnetic (EM) projections are possible as compared to conventional systems.

In one embodiment, the system focuses an USPL into air (or onto other materials) to produce a nonlinear interaction and plasma if the resulting electric field is high enough to reach ionization. In one embodiment, the system generates a broadband optical signal such as supercontinuum generation and/or an electromagnetic pulse (EMP). Defined control techniques for enhancing electro-magnetic attributes of short laser pulses at long range, with a specific alternate use of new laser wavelengths is described herein.

Propagation through air of a USPL at mid wave infrared (MWIR) wavelengths self generates harmonics on either side of the carrier spectrum (via high harmonic generation (HHG) and carrier shock wave mechanisms) creating a broadband supercontinuum, whose spectral components mix with each other as well as the fundamental beam and enhances secondary emissions, in the RF and THz domain for example.

One embodiment of the system of the present disclosure eliminates the need to propagate multiple beams and try to maintain proper phase and temporal overlap. This makes the system viable for long range operation since the harmonics are generated at the range where the emission occurs, and both spatial and temporal overlap is naturally ensured.

Embodiments of the present disclosure have simpler laser setups compared to conventional systems, due in part to having only one beam generated by the laser. These systems can produce the same phenomena in materials other than air. In some embodiments, the control and modulation of the laser induced emission is done by multiple levers. In some cases, they include beam polarization, beam chirp, beam size, and beam energy. All these parameters pertain to the laser beam output. Beam energy and beam polarization control the strength and orientation of the beam electric field and have effects on the harmonic generation and mixing process, thus affecting the strength of the nonlinear phenomena and the plasma emission. Beam size and beam chirp control the spatial and temporal profile of the laser beam at launch. The group velocity dispersion experienced by the laser beam as it propagates through the atmosphere results in temporal elongation of the beam. By chirping the laser beam one can pre-compensate for these distortions and thus control at what range the beam will have its shortest pulse width. In conjunction with beam energy and beam size, beam chirp will affect the range at which the laser beam starts self-focusing and as such where the harmonic generation and mixing process occurs. Thus, it controls the range at which the phenomena occurs. Long range up to several km can be expected with this method which is not possible with the current methods.

Referring to FIG. 1, a diagram of a conventional laser system configured for second harmonic generation (SHG) usable at short range (less than one meter) is shown. More specifically, a source 100 may be, for example, an 800 nm Ti: Sapphire laser, or the like. In some cases, the laser operates at 70 mJ, 10 Hz and has pulses in the 100 fs-2 ps range to generate a beam 120 that is passed through a wave plate 130 and a polarizer 140 that produces an output signal power level that is less than the input level with a fixed polarization state. This light is then passed through a beta barium borate (BBO) crystal 150, or other nonlinear object (NLO), for second harmonic generation (SHG) to produce beams having two colors of light (160, 170) (e.g., 800 nm and 400 nm). This system is only useful at short range (e.g., less than 1 meter) since it does not provide independent temporal compensation of the beams.

Figure 2:
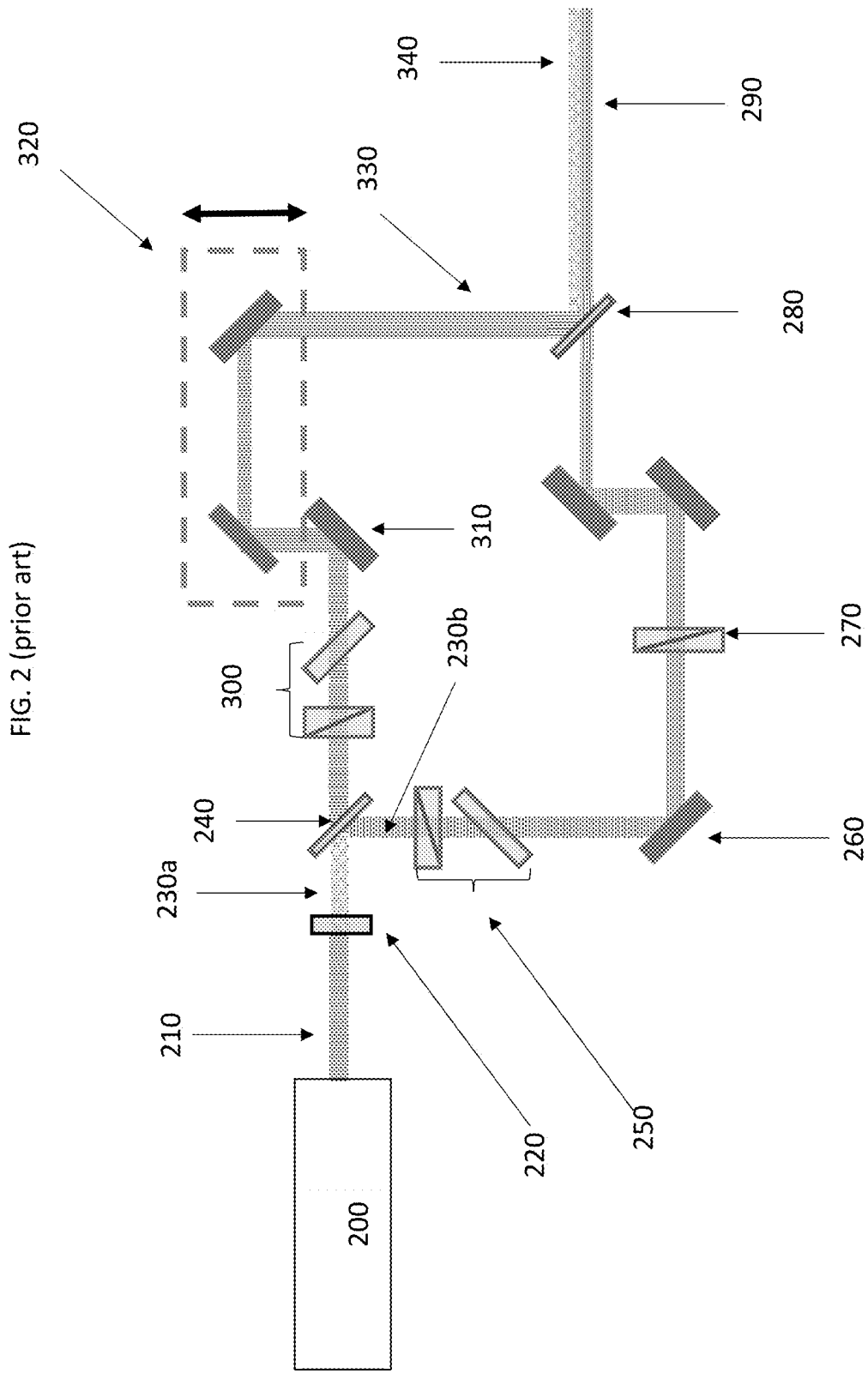
FIG. 2 is a diagram of another conventional laser system configured with two separate arms, for independent temporal control of the fundamental and second harmonic beam, usable at short to medium range (greater than one meter to tens of meters).

Referring to FIG. 2, the diagram of another conventional laser system configured for two separate arms of second harmonic generation (SHG) usable at short to medium range (greater than one meter to tens of meters). More specifically, these systems have independent control of the energy and polarization of both beams. In addition, it includes a variable delay line on the source beam to control the time delay between the first and second beams.

Still referring to FIG. 2, much like the system in FIG. 1, a source 200 may be, for example, an 800 nm Ti: Sapphire laser, or the like. In some cases, the laser operates at 70 mJ, 10 Hz and has pulses in the 100 fs-2 ps range to generate a primary beam 210 that is passed through a beta barium borate (BBO) crystal 220, or other nonlinear object (NLO), for second harmonic generation (SHG) to produce two beams each having a different color of light (230*a*, 230*b*) (e.g., 800 nm and 400 nm). This two-color beam is passed through a dichroic mirror 240 (800 nm/400 nm) to separate the paths for each of the two wavelengths of light. Each path (first path and second path) is separately passed through a wave plate/polarizer combination that produces an output signal power level that is less than the input level with fixed polarization state (250, and 300, respectively).

The first path (e.g., 400 nm), after passing through the polarizer/attenuator combination 250, is directed using mirrors 260 for 100% 400 nm light. This first path is passed through a 400 nm half wave plate 270 and a few other mirrors 260 for 100% 400 nm light and lastly through a second dichroic mirror 280 (400 nm/800 nm) to form a first beam 290 of 400 nm light. The second path (e.g., 800 nm), after passing through the polarizer/attenuator combination 300, is directed using mirrors 310 for 100% 800 nm light. Depending on the spacing of these mirrors for 100% 800 nm light a variable delay time 320 between the first and second beams can be created. The second path beam is passed through the second dichroic mirror 280 (400 nm/800 nm) to form a second beam 340 of 800 nm light that may be synchronized with the first beam, as needed.

Figure 3:
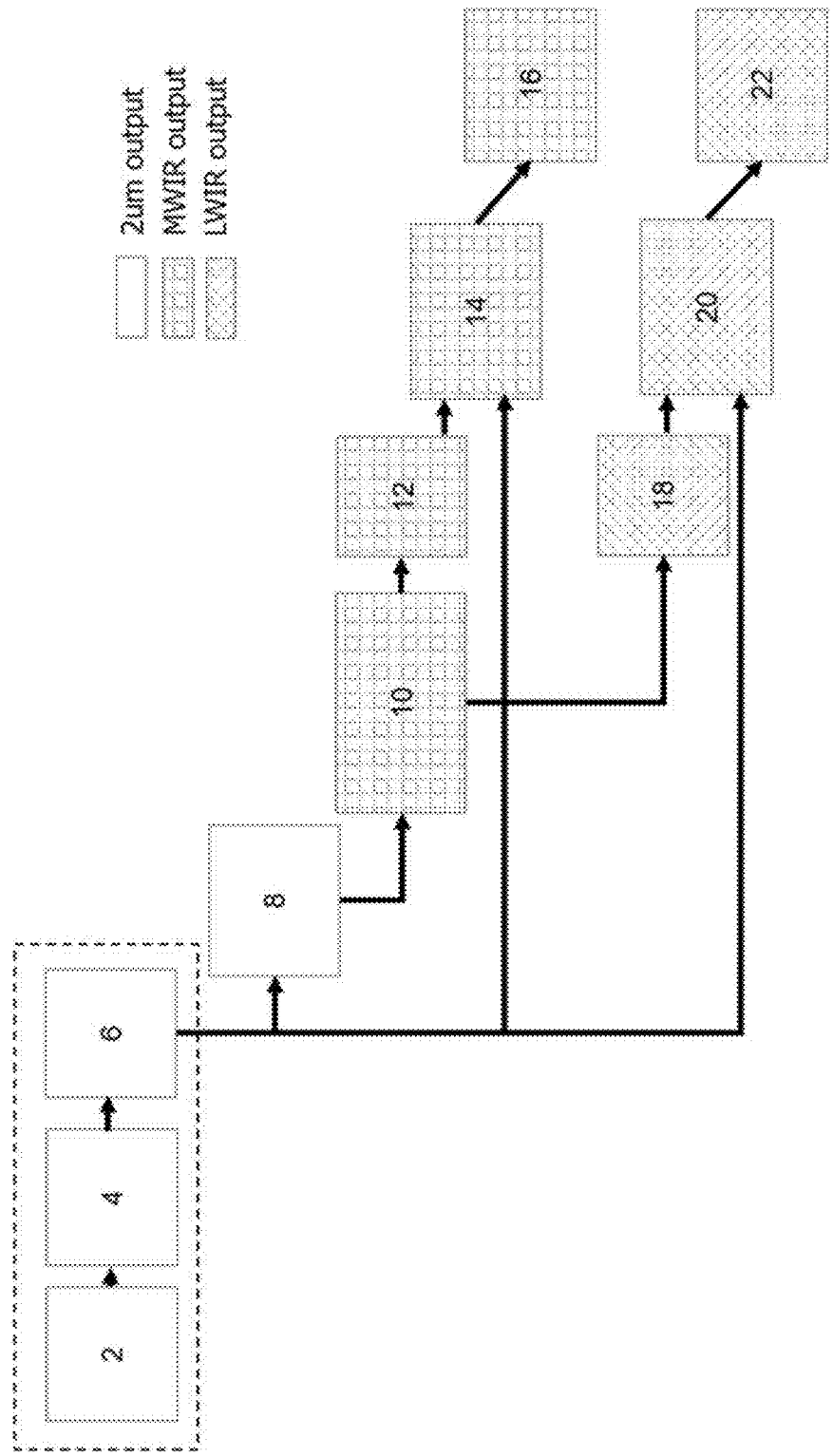
FIG. 3 is a diagram of an embodiment of a laser architecture used in the method of the present disclosure.

Referring to FIG. 3, a diagram of an embodiment of a laser architecture used in the method of the present disclosure is shown. More specifically, a 2 μm wavelength source is used as a common source/seed for multiple frequency bands. This architecture is applicable to other temporal regimes by removing stretcher/compressor stages. There, the energy may remain constant, but the power can be varied with stretching and compression. In one embodiment of the present disclosure, the fs-ns pulse width regime is addressed.

Using a laser operating in the MWIR range of the spectrum (2-6 μm) provides multiple advantages over other systems operating in the Near IR range (0.8-1 μm). First, depending on the wavelength, the system of the present disclosure provides lower dispersion than at 0.8 μm, or even zero dispersion at select wavelengths, for broadband/short pulse signals which allows propagating the beam over long range (>100s of meters) without experiencing significant temporal distortions. Second, at these longer wavelengths, the laser-matter interaction give rise to strong nonlinear effects favoring supercontinuum generation spanning multiple octaves. For instance, harmonics up to the $15^{th}$ order have been demonstrated with a laser operating at 3.9 μm while a laser operating at 800 nm can barely generate its second harmonic in air. Mixing of these new wavelength components with each other and with the fundamental laser beam allows in turn enhancing other emissions not only in the optical domain but also in the RF and THz ranges. Since all these processes are happening simultaneously at the range where the laser beam self focuses, there is no need to propagate separate wavelengths such as is the case for Near IR lasers. Range up to several km are possible with this scheme. Varying the laser polarization, chirp, and beam size allows for controlling the range at which the phenomena occurs.

Still referring to FIG. 3, the common 2 μm wavelength seed source simplifies synchronization and temporal overlap of pump and seed signals for OPCPA amplifiers. The longer wavelengths allow for high power atmospheric transmission in contrast to a 0.8 μm spectral source. In some cases, the resulting architecture is also compact due to the reduced laser complexity. An ultra-short pulse laser oscillator 2 operates at about 2 μm wavelength in about the 100 fs range. These signals are fed into a pulse stretcher 4 at 2 μm and are stretched to the 500 ps to 1 ns range. The signals are then amplified 6 at the 2 μm range, within the 2 μm source. The energy is compressed via a 2 μm compressor 8. This stretching and compressing in known as chirp-pulse amplification. A stretcher is useful so that amplification can be done on longer pulses and avoid damaging effects. The compression step provides for a strong pulse in ultra-short (e.g. femtosecond) pulse lengths. In some cases, these high-power, ultra-short pulses can be used for atmospheric or material effects at longer ranges.

The output from the 2 μm compressor 8 is fed into a non-linear optical medium (NLO) 10 (e.g., gas or crystal). The incoming signal is focused on the crystal and depending on how the crystal is oriented, it produces wide broadband emission. Here, the system is from a 2 μm signal and via down-conversion it produces a longer wavelength (e.g., 4 μm or 10 μm). The signals, after being subjected to the NLO, are fed into either a first path (e.g. MWIR) or a second path (e.g., LWIR). In this embodiment, the first path comprises a pulse stretcher 12 for the mid wave IR signal, an OPCPA amplifier 14, and a MWIR compressor 16 for the mid wave IR portion of the spectrum. In certain embodiments, the OPCPA for the MWIR path comprises a Zinc Germanium diphosphide (ZGP) crystal and produces 2-8 μm wavelengths. It is understood that various NLOs are applicable depending on the incoming wavelength and the desired output. The second path comprises a pulse stretcher 18 for the long wave IR signal, an OPCPA amplifier 20, and a LWIR compressor 22 for the long wave IR portion of the spectrum. In certain embodiments, the OPCPA for the LWIR path produces 8-12 μm wavelengths.

One embodiment of the method of optical mixing for controlling electro-magnetic attributes of laser induced plasma emission of the present disclosure is used to perturb optical and electronic equipment. As the laser pulse propagates through the atmosphere, it experiences self-focusing and starts generating nonlinear effects, which produces broadband secondary optical emissions at other wavelengths. Optical equipment might get damaged or temporarily disabled by the newly created optical wavelengths, such as cameras for example. Additionally, when the electric field of the beam is high enough to ionize molecules in the air or on material surfaces, it gives rise to a plasma region. In turn, the plasma produces broadband RF emission. Electronic equipment might get damaged or temporarily disabled by this RF emission. The more peak power in the system, usually obtained with short pulse width in the 100 fs range, the higher the electric field of the beam when it self focuses and the higher the RF emission.

It is understood that the self-generated broadband optical emission occurring when the beam is self-focusing includes $2^{nd}$ harmonic (or other harmonics) of the fundamental laser wavelength, which strongly enhances the strength of the RF emission (e.g., 100×) even when only a small amount of the harmonic is created. As noted before, for this enhancement to happen the fundamental laser wavelength and its harmonic must overlap temporally and spatially. With the system and method of the present disclosure this is possible as the harmonics are part of the secondary emissions of the laser beam. Thus, they are naturally created at the same time and location where the secondary emission happens. It avoids the need to propagate multiple laser beams as discussed in the prior systems.

Figure 4:
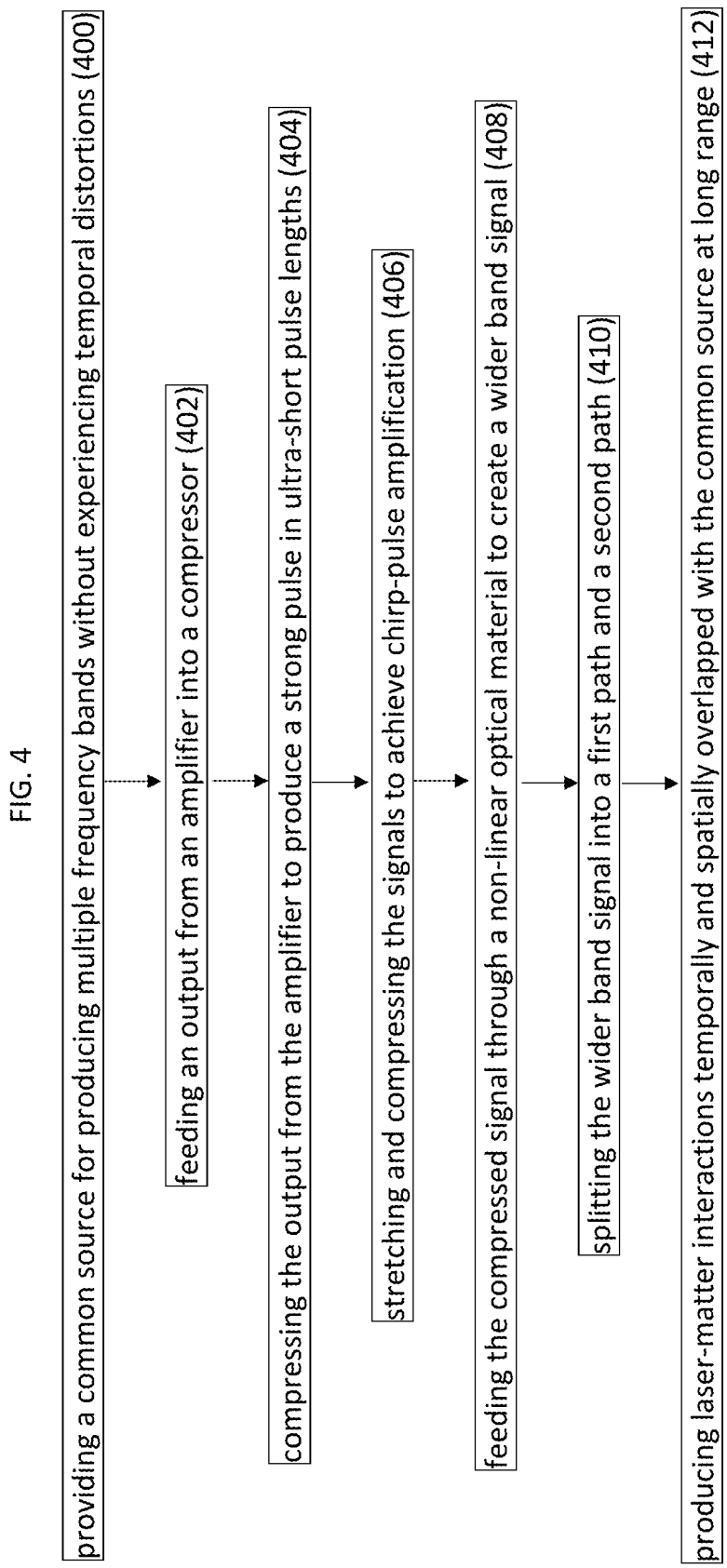
FIG. 4 is a flowchart of one embodiment of a method of optical mixing for controlling electro-magnetic attributes of emitted laser pulses according to the principles of the present disclosure.

In another embodiment, focusing the laser on a material produces physical damage to the material and fs range pulse width typically produces material ablation, which can degrade said material integrity and resistance. For longer pulse width, in the ns range, physical damage occurs through thermal mechanism Referring to FIG. 4, a flowchart of one embodiment of a method of optical mixing for controlling electro-magnetic attributes of emitted laser pulses according to the principles of the present disclosure is shown. More specifically, the system and method provide a common source for producing multiple frequency bands without experiencing temporal distortions 400. The output from an amplifier is fed into a compressor 402 and the output from the amplifier is compressed to produce a strong pulse in ultra-short pulse lengths 404. Stretching and compressing the signals achieves chirp-pulse amplification 406. The compressed signal is fed through a non-linear optical material to create a wider band signal 408 and the wider band signal is split into a first path and a second path 410. Laser-matter interactions are produced at long range, having nonlinear effects, and favoring supercontinuum generation spanning multiple octaves, that is temporally and spatially overlapped with the common source 412.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of controlling electro-magnetic attributes of emitted laser pulses, comprising:
   receiving, at an amplifier, a light signal from a common source operating in the midwave infrared (MWIR) range,
   amplifying the light signal to create an amplified light signal;
   transmitting the amplified light signal to a compressor;
   compressing the amplified light signal to create a compressed light signal;
   propagating the compressed light signal through a non-linear optical material to create a wide band light signal; and
   splitting the wide band light signals into a first path signal and a second path signal wherein the first path signal and the second path signal are directed to respective first and second paths;
   wherein the first path comprises a pulse stretcher, an optical parametric chirped-pulse amplification (OPCPA) amplifier, and a MWIR compressor; and
   wherein the second path comprises a pulse stretcher, an OPCPA amplifier, and a long wave infrared (LWIR) compressor.

2. The method according the claim 1, wherein the common source further comprises an ultra-short pulse laser oscillator, the ultra-short pulse laser oscillator operates at about 2 μm wavelength.

3. The method according to claim 1, wherein after exiting the first path, the first path signal is propagated through the atmosphere.

4. The method according to claim 1, wherein the non-linear optical material is a Zinc Germanium diPhosphide (ZGP) crystal.

5. The method according to claim 1, wherein the MWIR portion of the first path is about 2-8 μm and the LWIR portion of the second path is about 8-12 μm.

6. The method according to claim 1, further comprising varying at least one of the first path signal polarization, amplification level of the light signal from the common source, compression level of the amplified light signal, and beam size.

7. The method according to claim 1, wherein after exiting the second path, the second path signal is propagated through the atmosphere.

8. The method according to claim 1, wherein propagation through air at the MWIR or LWIR wavelengths self generates harmonics on either side of the carrier spectrum via high harmonic generation and supercontinuum generation.

9. A method for controlling electro-magnetic attributes of emitted laser pulses, the method comprising:
receiving, at a pulse stretcher, a light signal emitted from an ultra-short laser;
causing the pulse stretcher to stretch the light signal to create a pulse-stretched light signal at a desired temporal range;
receiving, at an amplifier, the pulse-stretched light signal and amplifying the pulse-stretched light signal to a predetermined range;
receiving, at a compressor, an amplified pulse-stretched light signal and compressing the amplified pulse-stretched light signal;
transmitting, from the compressor, the amplified pulse-stretched light signal to a non-linear optical medium, wherein the non-linear optical medium widens the frequency band of the amplified pulse-stretched light signal to create a widened signal;
splitting the widened signal into a first widened signal and a second widened signal;
directing the first widened signal to a first signal path and the second widened signal to a second signal path, wherein the first signal path comprises:
a first signal path pulse stretcher;
a first signal path optical parametric chirp-pulse amplification amplifier; and
a longwave infrared compressor; and
wherein the second signal path comprises:
a second signal path pulse stretcher;
a second signal path optical parametric chirp-pulse amplification amplifier; and
a midwave infrared compressor.

10. The method of claim 9 wherein the second widened signal has a wavelength about 2-8 µm.

11. The method of claim 9 wherein the non-linear optical medium is a Zinc Germanium diPhosphide (ZGP) crystal.

12. The method of claim 9 wherein spectral components of light signals generated by the first path, the second path, or a combination thereof are propagated through the atmosphere.

13. The method of claim 11 wherein the spectral components further comprise spectral components of the original light signal.

14. The method of claim 12 wherein the combined spectral components are directed towards electronic equipment.

15. The method of claim 9, wherein propagation through air at the midwave infrared or longwave infrared wavelengths self generates harmonics on either side of the carrier spectrum via high harmonic generation and supercontinuum generation.

16. An apparatus, the apparatus comprising:
an ultra-short laser;
a pulse stretcher operably connected to the ultra-short laser, wherein the pulse stretcher receives a light signal from the ultra-short laser and stretches said light signal to a desired temporal range;
an amplifier operably connected to the pulse-stretcher and configured to amplify a light signal received from the pulse stretcher;
a compressor configured to receive, from the amplifier, an amplified light signal and further configured to compress the amplified light signal;
a non-linear optical medium operably connected to the compressor, wherein the non-linear optical medium receives a light signal from the compressor and splits the light signal into a plurality of signals wherein each of the plurality of signals is redirected towards a plurality of paths;
wherein the plurality of paths include at least one of a first path comprising:
a first signal path pulse stretcher;
a first signal path optical parametric chirp-pulse amplification amplifier; and
a longwave infrared compressor;
and a second path comprising:
a second signal path pulse stretcher;
a second signal path optical parametric chirp-pulse amplification amplifier; and
a midwave infrared compressor.

17. The apparatus of claim 16 wherein the light signal received by the non-linear optical medium converts the light signal wavelength to about 2-8 µm.

18. The apparatus of claim 16 wherein the non-linear optical medium is a Zinc Germanium diPhosphide (ZGP) crystal.

19. The apparatus of claim 16, wherein propagation through air at the midwave infrared or longwave infrared wavelengths self generates harmonics on either side of the carrier spectrum via high harmonic generation and supercontinuum generation.

* * * * *